US009053081B2

(12) United States Patent
Friedrich et al.

(10) Patent No.: US 9,053,081 B2
(45) Date of Patent: Jun. 9, 2015

(54) CREATING, UPDATING, SAVING, AND PROPAGATING CUSTOMIZED VIEWS OF TABLE AND GRID INFORMATION

(75) Inventors: Thomas Friedrich, San Jose, CA (US); Alexander Daniel Robinson, Austin, TX (US); Kathy J. Setzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 13/405,172

(22) Filed: Feb. 24, 2012

(65) Prior Publication Data
US 2012/0159303 A1 Jun. 21, 2012

Related U.S. Application Data

(63) Continuation of application No. 12/553,211, filed on Sep. 3, 2009, now Pat. No. 8,775,921.

(51) Int. Cl.
*G06F 17/00* (2006.01)
*G06F 17/24* (2006.01)

(52) U.S. Cl.
CPC ............ *G06F 17/245* (2013.01); *G06F 17/246* (2013.01)

(58) Field of Classification Search
CPC .............................. G06F 17/245; G06F 17/246
USPC .......................................... 715/205, 210, 227
See application file for complete search history.

(56) References Cited

U.S. PATENT DOCUMENTS

| 5,426,781 | A | | 6/1995 | Kaplan et al. |
| 5,893,125 | A | * | 4/1999 | Shostak ........................ 715/206 |
| 6,058,391 | A | | 5/2000 | Gardner |
| 6,526,399 | B1 | | 2/2003 | Coulson et al. |
| 6,535,872 | B1 | | 3/2003 | Castelli et al. |

(Continued)

FOREIGN PATENT DOCUMENTS

EP 1475733 11/2004

OTHER PUBLICATIONS

International Search Report and Written Opinion for International Application No. PCT/EP2010/062177, dated Dec. 3, 2010, 10 pp.
Preliminary Amendment, dated Feb. 24, 2012, for U.S. Appl. No. 12/553,211 (54.53), filed Sep. 3, 2009, invented by Thomas Friedrich et al., Total 5 pages.
Preliminary Remarks, dated Apr. 18, 2012, for U.S. Appl. No. 12/553,211 (54.53), filed Sep. 3, 2009, invented by Thomas Friedrich et al., Total 1 pages.

(Continued)

*Primary Examiner* — Stephen Hong
*Assistant Examiner* — Marshon Robinson
(74) *Attorney, Agent, or Firm* — Janaki K. Davda; Konrad, Raynes, Davda and Victor LLP

(57) ABSTRACT

Systems, methods, and computer products that create, update, save, and propagate customized views of table and grid information, including spreadsheets. The embodiment of the invention comprises associating at least one column as a first view of the table, associating at least one column as a second view of the table; and combining the first view with the second view, thereby efficiently creating a third view. Further, the combining includes dragging the second view; and dropping the dragged second view into the first view. The combining also includes creating a thumbnail image representing the first view or the second view. It also comprises updating columns that are shared between views. Additionally, the views may be stored, and new views may be propagated from the stored views.

7 Claims, 9 Drawing Sheets

(56) References Cited

U.S. PATENT DOCUMENTS

| | | | |
|---|---|---|---|
| 6,553,371 | B2 | 4/2003 | Gutierrez-Rivas et al. |
| 6,626,959 | B1* | 9/2003 | Moise et al. .................. 715/210 |
| 7,158,994 | B1 | 1/2007 | Smith et al. |
| 7,908,266 | B2 | 3/2011 | Zeringue et al. |
| 8,347,204 | B2 | 1/2013 | Rosner |
| 8,775,921 | B2 | 7/2014 | Friedrich et al. |
| 2005/0071318 | A1 | 3/2005 | Court et al. |
| 2006/0173862 | A1 | 8/2006 | Sauermann |
| 2006/0224551 | A1 | 10/2006 | Lariba-Pey et al. |
| 2007/0067710 | A1 | 3/2007 | Clark et al. |
| 2008/0229242 | A1* | 9/2008 | Goering ........................ 715/810 |
| 2008/0276162 | A1* | 11/2008 | Birdwell et al. .............. 715/227 |
| 2009/0012990 | A1 | 1/2009 | Lariba-Pey et al. |
| 2010/0114809 | A1* | 5/2010 | Birdwell et al. ................ 706/47 |
| 2011/0022561 | A1* | 1/2011 | Birdwell et al. ................ 706/47 |
| 2011/0055682 | A1 | 3/2011 | Friedrich et al. |

OTHER PUBLICATIONS

Office Action, dated Mar. 18, 2013, for U.S. Appl. No. 12/553,211 (54.53), filed Sep. 3, 2009, invented by Thomas Friedrich et al., Total 15 pages.

Response to Office Action, dated Jun. 13, 2013, for U.S. Appl. No. 12/553,211 (54.53), filed Sep. 3, 2009, invented by Thomas Friedrich et al., Total 9 pages.

Final Office Action, dated Sep. 12, 2013, for U.S. Appl. No. 12/553,211 (54.53), filed Sep. 3, 2009, invented by Thomas Friedrich et al., Total 10 pages.

Response to Final Offiice Action, dated Dec. 11, 2013, for U.S. Appl. No. 12/553,211 (54.53), filed Sep. 3, 2009, invented by Thomas Friedrich et al., Total 10 pages.

Notice of Allowance, dated Feb. 28, 2014, for U.S. Appl. No. 12/553,211 (54.53), filed Sep. 3, 2009, invented by Thomas Friedrich et al., Total 8 pages.

\* cited by examiner

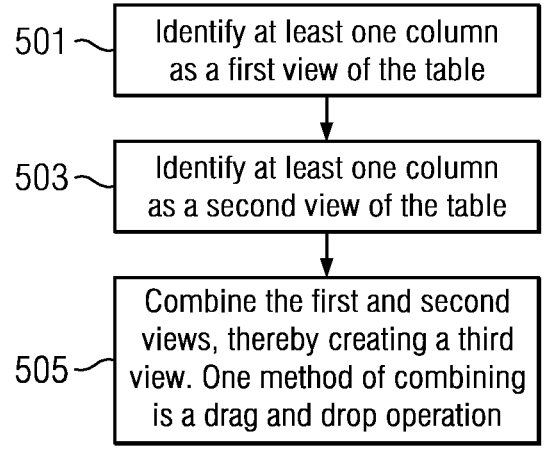
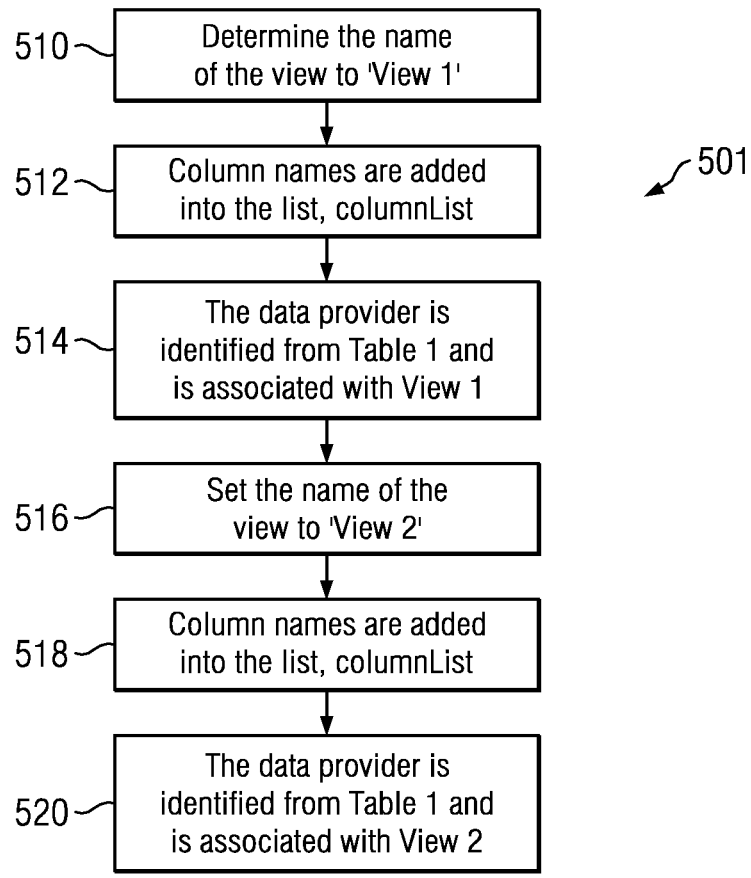

CREATING, UPDATING, SAVING, AND PROPAGATING CUSTOMIZED VIEWS OF TABLE AND GRID INFORMATION

CROSS-REFERENCE TO RELATED APPLICATIONS

This application is a continuation of and claims the benefit of "CREATING, UPDATING, SAVING, and PROPAGATING CUSTOMIZED VIEWS of TABLE AND GRID INFORMATION", having application Ser No. 12/553,211, filed Sep. 3, 2009, the entire contents of which is incorporated herein by reference.

BACKGROUND OF THE INVENTION

1. Field of the Invention

The present invention is directed to the field of computer-based representation of table or data grid information. It is more particularly directed to efficiently creating, updating, saving, and propagating customized views of table and grid information, including spreadsheets.

2. Description of the Background Art

Many businesses store data in formats such as data tables, data grids, and spreadsheets. A table typically consists of columns that represent attribute types and records that represent specific instances of data that is associated with attribute instances identified in columns.

Large data grids and tables can be difficult to view. This is especially true for grids that contain a large number of columns and require horizontal scrolling across multiple viewing screens. Also, existing tables and data grids do not adequately address the issue of viewing multiple columns that are physically separate from each other. Current means of hiding or collapsing columns allow this, and allow revealing of particular columns, but require extensive time and effort to collapse or reveal columns. They do not allow the user to easily view the desired content in a timely fashion.

In the past, spreadsheet technology offered additional solutions to help in viewing data in a large data grid, such as locking particular header sections of tables or data grids to allow vertical scrolling in context. Filtering and searching are also methods that enable customized viewing of data in spreadsheets. These methods are typically not efficient to use.

From the foregoing it will be apparent that there is still a need to improve creating, updating, saving, and propagating of customized views of table and grid information, including spreadsheets, on a computer system.

SUMMARY OF THE INVENTION

An embodiment of the present invention relates to systems, methods, and computer products that efficiently create, update, save, and propagate customized views of table and grid information, including spreadsheets. More particularly the present invention enables user-friendly, easy manipulation of data in a table or grid so that the data can be presented in different views, while still maintaining the master view of the data in the table or grid, and enabling editing of the data. An embodiment of the present invention for efficiently creating views from the columns of a table, comprises associating at least one column as a first view of the table, associating at least one column as a second view of the table; and combining the first view with the second view, thereby efficiently creating a third view. Further, the combining may include dragging the second view; and dropping the dragged second view into the first view. The combining also may include creating a thumbnail image representing one view, dragging the thumbnail image to another view; and dropping the thumbnail image into the other view. One embodiment also comprises updating at least one of the columns in the first view or the second view, wherein the updated column is automatically updated in the third view. Also the first view may include the original table.

Additionally, an embodiment of the present invention comprises associating at least one column in the third view that is also associated with the first view, updating that column in the third view, and thereby automatically updating the associated column in the first view. Further, the third view may be stored and a new view may be propagated from the stored third view.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 2 illustrates a view for manipulating the tables of the present invention;

FIG. 4B illustrates the view that was created in FIG. 4A;

FIG. 5 includes FIG. 5A, FIG. 5B, FIG. 5C, FIG. 5D, and FIG. 5E;

FIG. 5A is a flow chart that illustrates an embodiment of the method of the present invention;

FIG. 5B is a flow chart that illustrates creating a view;

DESCRIPTION OF THE INVENTION

Figure 1:
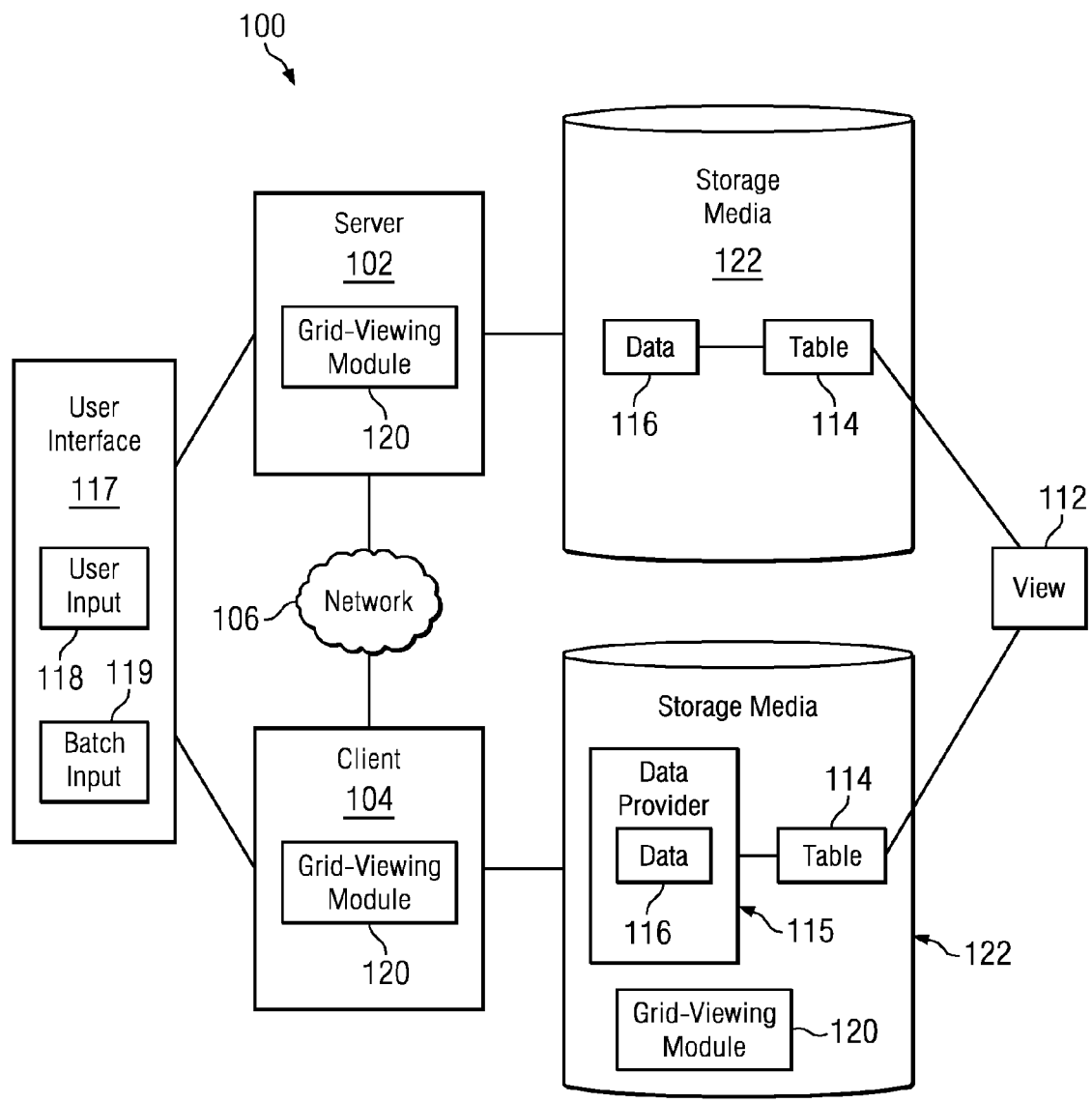
FIG. 1 is a block diagram that illustrates an embodiment of the present invention.

As shown in the drawings and for purposes of illustration, an embodiment of the present invention novelly creates, updates, saves, and propagates customized views of table and grid information, including spreadsheets. Existing computer systems have not been able to efficiently and adequately create a user-friendly way of viewing and propagating updates and changes of selected data in a table and grid, including spreadsheets.

The present invention provides a mechanism for creating views from the columns of a table. More particularly the present invention enables user-friendly, easy manipulation of data in a table or grid so that the data can be presented in different views, while still maintaining the master view of the data in the table or grid, and enabling editing of the data. Embodiments of this invention aid the user in reviewing or working with data in a table or grid, and aid the user in accessing and manipulating data stored in a table. It will be understood by those skilled in the art that a 'view' is a visual representation of one or more rows and one or more columns of a table, and may be represented in a graphical user interface (GUI).

The present invention novelly enables a user-friendly mechanism to create views and persist or save data in various views. The saved data may then be propagated to new views. Further, the present invention enables a user-friendly mechanism for updating views of the table, either the original table view or subsequent table views, and thereby propagating the updated data to other views of the table that include the updated data.

It will be understood by those skilled in the existing art, that a header in a spreadsheet is used to identify a column in a spreadsheet. It is possible, with enough effort by a user, to hide particular columns in a spreadsheet report. This may be accomplished by selecting specified columns by the associated header information and identifying those selected columns to be hidden from the current spreadsheet view.

Another existing way of simplifying the view in a spreadsheet is to freeze or lock particular columns or rows. In this manner, key columns, such as a column having names identifying each entry in a particular row, can be locked. Then, as a user scrolls across a spreadsheet with a large number of columns, the identified column will be retained in the current view, while unidentified columns will be scrolled.

Yet another existing way of simplifying the view in a spreadsheet is to filter data. For instance, a user can identify a particular entry in a column, and execute a command so that the view of the spreadsheet is reduced to just those rows that contain the identified entry in the specified column. This provides a limited view of the table data and the rows associated with the filtered data.

An embodiment of the present invention efficiently creates views of specified columns of a table by associating columns into a first view, and associating other columns into a second view. Then, the columns identified in the second view can be associated with the first view by data manipulation techniques such as dragging and dropping the columns of the second view into the first view; or by highlighting a thumbnail version of the columns in the second view and moving them to the first view. The columns of the second view now associated with the first view are combined to create a third view.

As shown in FIG. 1 and in element 100, an embodiment of the present invention may operate in a client-server computer system configuration. Therefore, a client computer system 104 may communicate with a server computer system 102 during the operation of the present invention. The grid-viewing module 120 operates in either the client 104 or the server 102 to perform an embodiment of the present invention. For example, information may be communicated to either the server 102 or the client 104 via the user interface 117, or via a network 106. Data 116 is stored in a table 114 and is used to create views 112 by the grid-viewing module 120. Data 116 may be obtained from a data provider 115. A data provider is populated with actual data, and the actual data may be stored in a storage media 122. A database is one implementation of a data provider. It will be understood that a view 112 can be stored on a storage media, such as the disk 122 as illustrated herein, or may be stored in memory 658 (as described in FIG. 6), or it may be presented to the user without access to storage.

The user interface 117 may communicate with an embodiment of the present invention, either via batch input 119 or user input 118.

Further, the grid-viewing module 120 may be configured in the memory 658 of either the client 104 or the server 102. Alternatively, the grid viewing module 120 may be configured in computer storage such as that of a disk 122. In an embodiment of the present invention, the grid-viewing module 120 is configured in computer storage of a disk 122 associated with a client 104.

Figure 2:
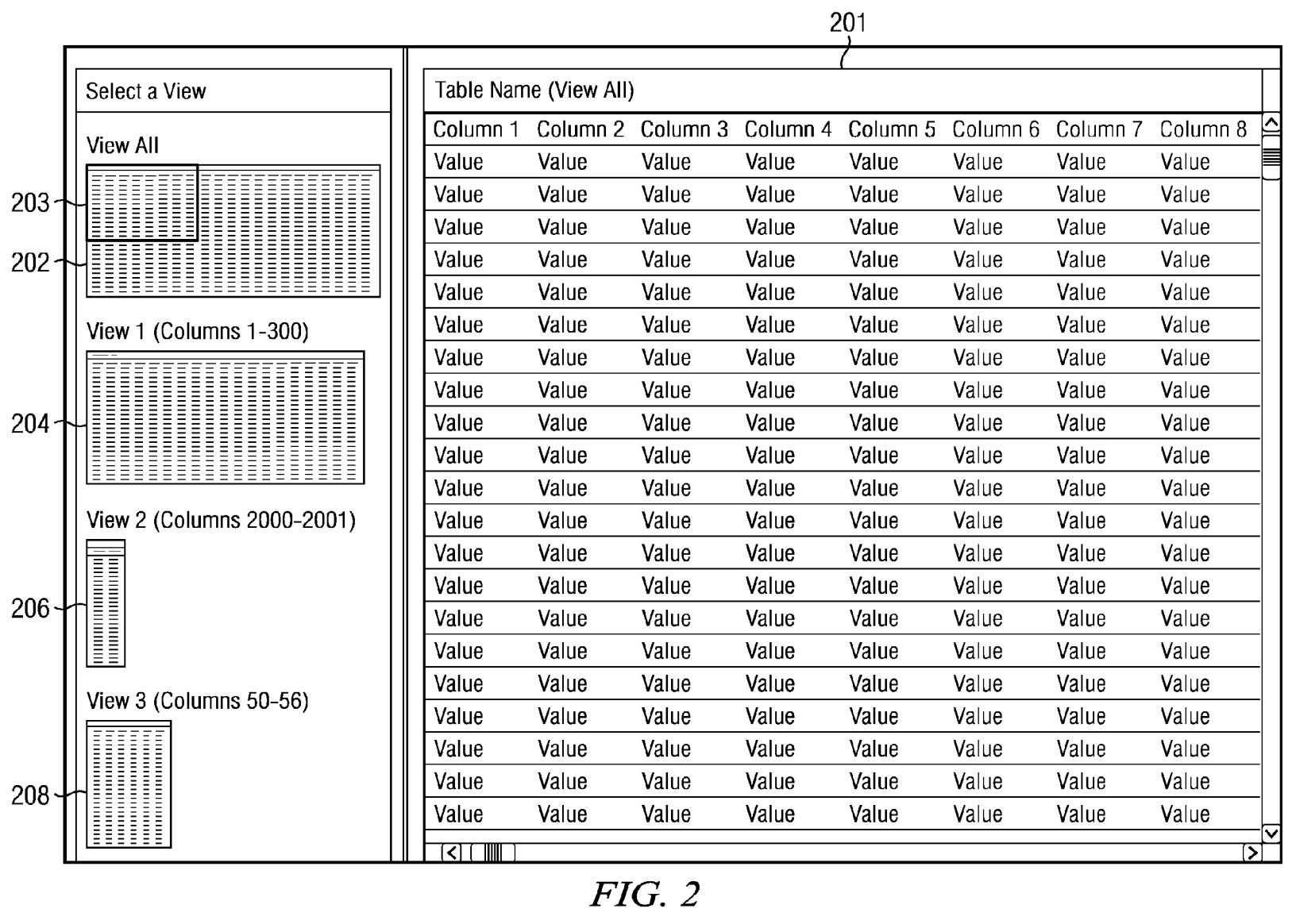

FIG. 2 illustrates alternate embodiments for manipulating tables 114, such as grids, spreadsheets, or the like. From the large 'View All' view 201, the user could horizontally scroll through all columns (in this illustration, 5000 columns) in the table 114. The present invention is illustrated here with a thumbnail view of the 'View All' view, as shown in element 202. Further, the user has defined a thumbnail view of columns 1-8 of table 114, as shown in element 203.

The user has also created the following thumbnail portions of the table 114: View 1 (Columns 1-300), as shown in element 204; View 2 (Columns 2000-2001), as shown in element 206; and View 3 (Columns 50-56), as shown in element 208. These subset views 112 were selected to illustrate information of particular interest to the user. (Elements 112 and 114 are described with reference to FIG. 1.)

While illustrations shown herein use drag and drop and thumbnail technology, it will be understood that other alternatives, such as those meeting accessibility requirements (e.g. voice-activated choice of views 112, and the like) may be employed.

Figure 3:
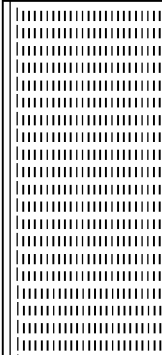
FIG. 3 illustrates choosing two columns out of many columns in a table and displaying the two chosen columns.

FIG. 3 illustrates the user displaying a subset view 112. Here, View 2 is a thumbnail view, as shown in element 206 that has been displayed in full view, as shown in element 210. In one embodiment of the present invention, the data value 212 is modified. The new value for data value 212 is propagated so that any view of column 2001 including data value 212 will be updated. FIG. 3 also illustrates the consistent presentation of manipulated data, in the form of table 'View All' thumbnail, as shown in element 202; and View 1 thumbnail, as shown in element 204; and View 3 thumbnail in element 208. Element 112 is shown in FIG. 1.

Figure 4A:
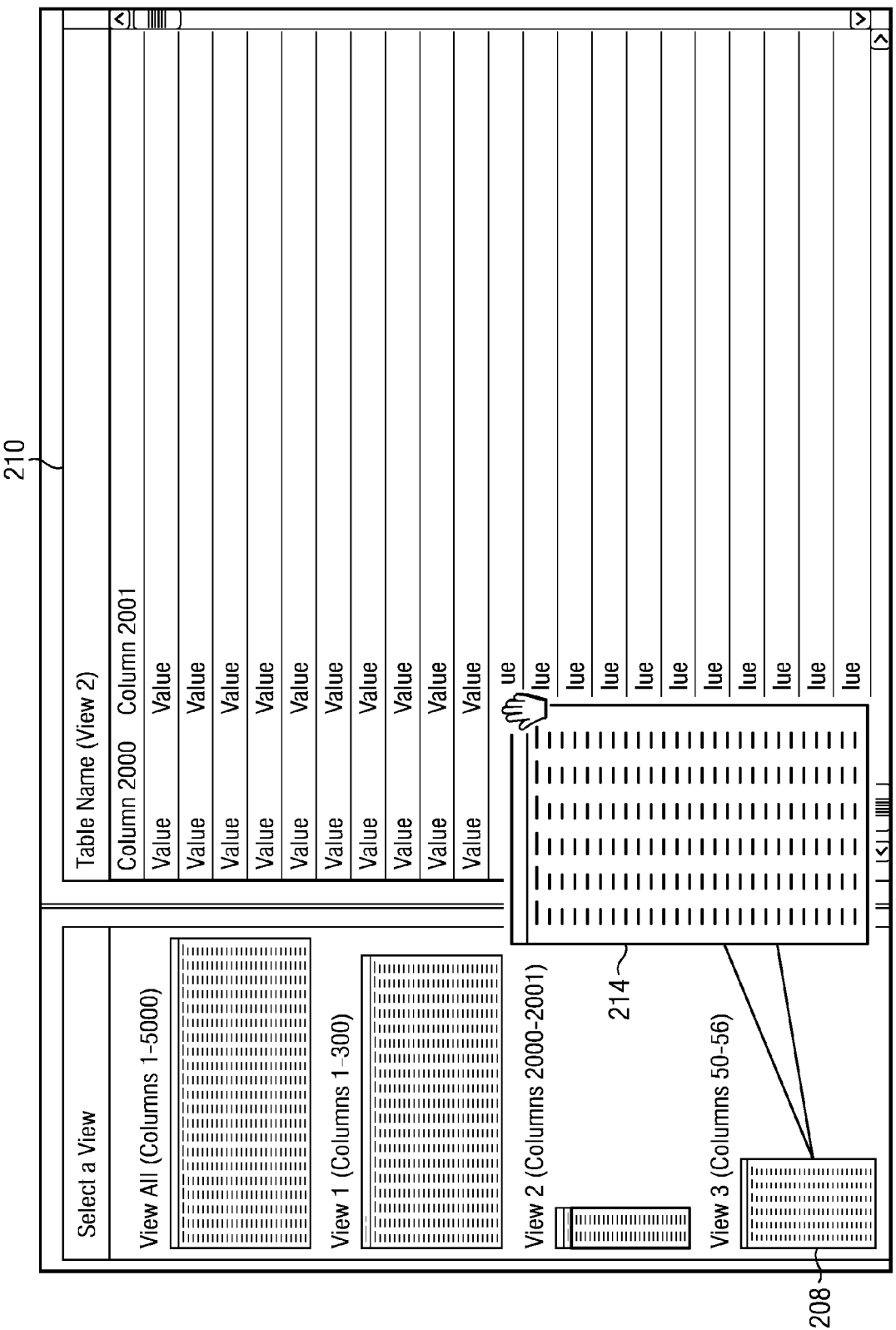
FIG. 4A illustrates combining two views.

FIG. 4A illustrates one embodiment of the present invention, in which the user can combine two or more views 112. Here, View 3 thumbnail, element 208, is dragged and dropped into the full version of View 2, element 210. The act of dragging and dropping is shown in element 214.

Figure 4B:
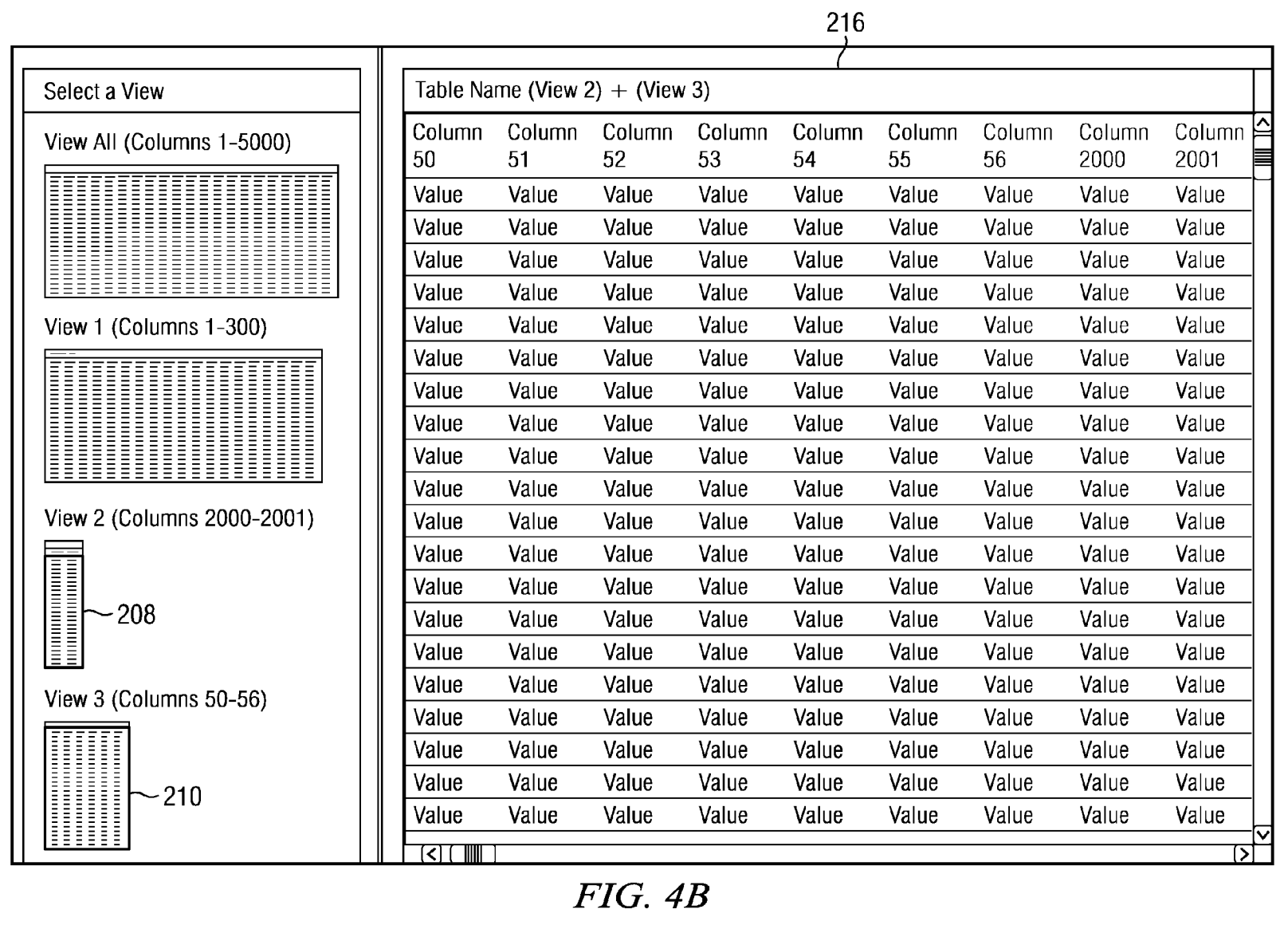

FIG. 4B illustrates the resulting combination described in FIG. 4A. More particularly, the combination of View 2, element 208, and View 3, element 210, is shown in element 216. This new combined view 216 consists of columns 50-56 and columns 2000-2001 of the table 114, and may be saved as a new view 112.

Figure 5C:
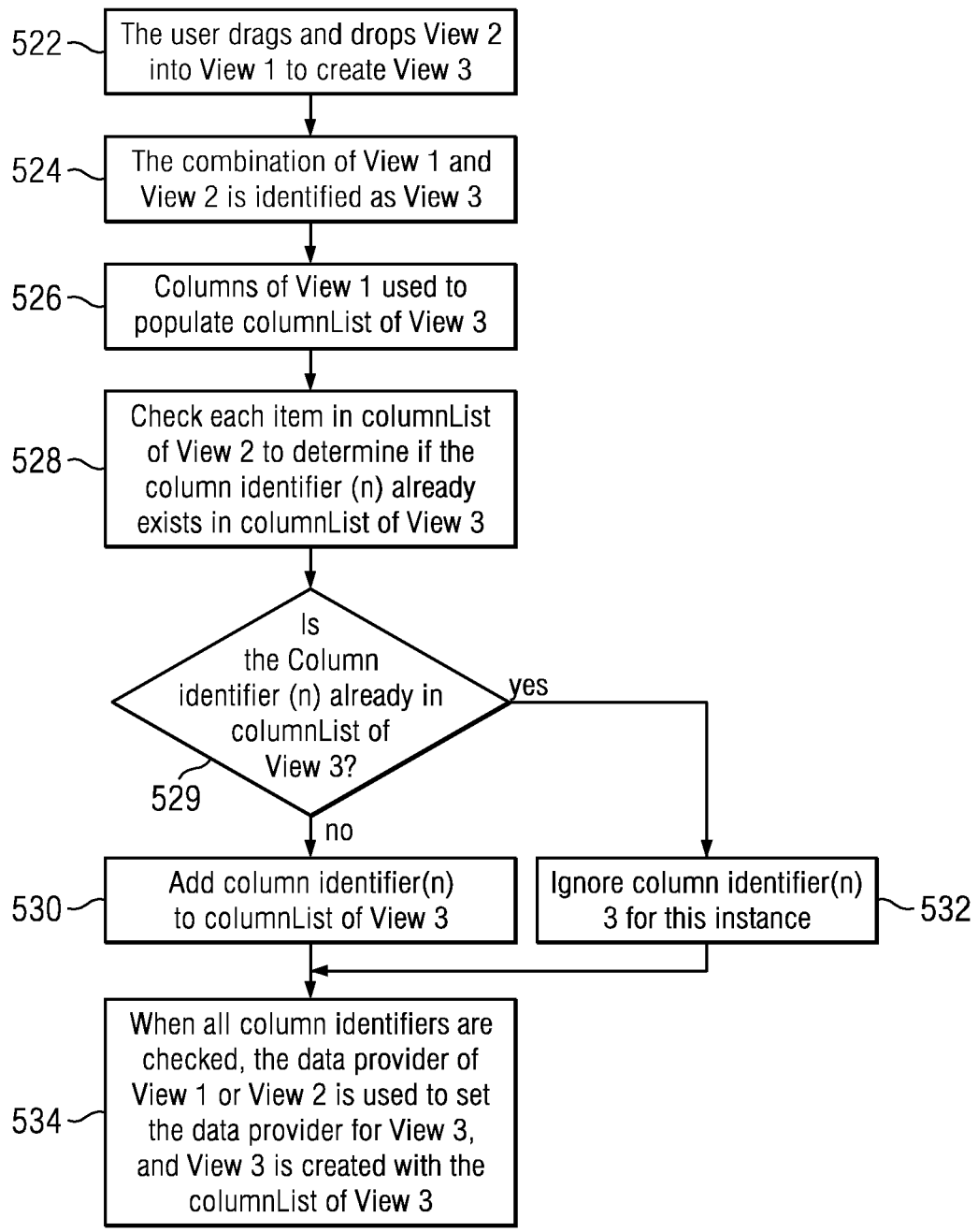
FIG. 5C is a flow chart that illustrates associating columns by dragging and dropping views.
Figure 5D:
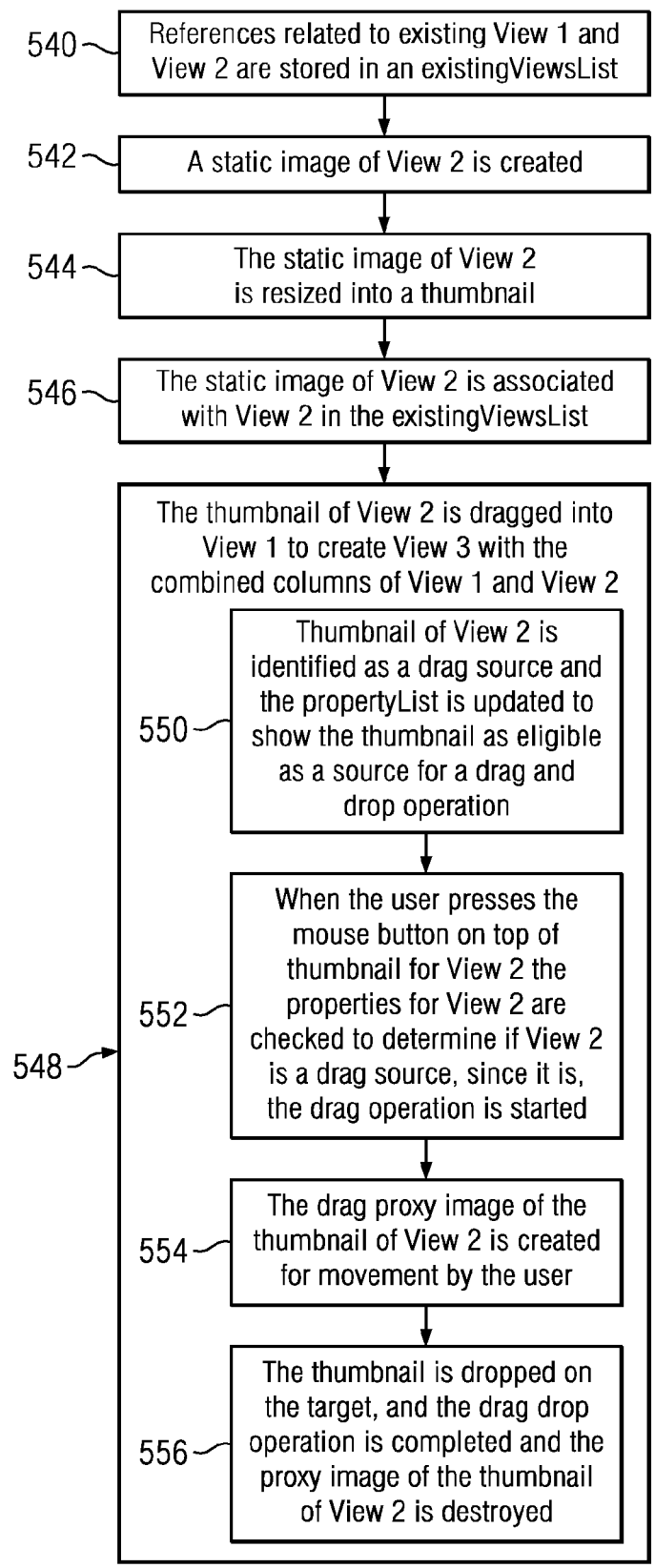
FIG. 5D is a flow chart that illustrates associating columns by creating thumbnail images.
Figure 5E:
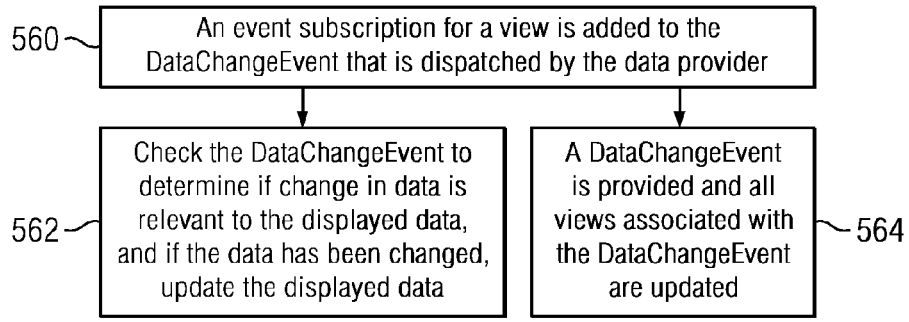
FIG. 5E is a flow chart that illustrates adding an event subscription.

FIG. 5 describes an embodiment of the method of implementing the present invention. FIG. 5 includes FIG. 5A, FIG. 5B, FIG. 5C, FIG. 5D and FIG. 5E. Table 1 is an example that is used herein to describe an embodiment of the method of the present invention, and will be referred to throughout the discussion of FIG. 5. Table 1 includes ten columns (Column 1 through Column 10); and three rows (Row 1 through Row 3). Table 1 is a visual representation of data 116 from a data provider. The following elements are described with reference to FIGS. 1: 112, 114, 115, 116, and 122.

Each column of Table 1 is associated by name with an actual column of the data provider which identifies the data 116 that is shown in a particular column of Table 1. The combination of a particular row and column in the table identifies a particular value that represents data 116 from the data provider. For example Column 2, Row 2 identifies one particular cell in Table 1, which shows a unique data value of the data provider (here having the value '2'). Further, illustrating the invention, if the user changes any value in a view of Table 1, the change is propagated to the underlying data provider by identifying the cell which changed by its row identifier and column identifier, and updating the corresponding row in the data provider accordingly. Likewise, if any data 116 changes in the underlying data provider, for example because data has changed in the storage media 122, the change is propagated back to Table 1, which may be represented by a view 112. By means of example and in the embodiment of the present invention, repopulating the data 116 in Table 1 with the current data from the data provider may be triggered by an event which is dispatched when data 116 has been updated in the data provider. It will be understood by those skilled in the art that 'rows' may be referred to as 'records'.

TABLE 1

|       | Column 1 | Column 2 | Column 3 | Column 4 | Column 5 | Column 6 | Column 7 | Column 8 | Column 9 | Column 10 |
|-------|----------|----------|----------|----------|----------|----------|----------|----------|----------|-----------|
| Row 1 | 1        | 1        | 1        | 1        | 1        | 1        | 1        | 1        | 1        | 1         |
| Row 2 | 2        | 2        | 2        | 2        | 2        | 2        | 2        | 2        | 2        | 2         |
| Row 3 | 3        | 3        | 3        | 3        | 3        | 3        | 3        | 3        | 3        | 3         |

Referring now to FIG. 5A, a first view 112 is identified as shown in element 501. In an embodiment of the present invention, a view 112 is represented herein by the tables described with reference to FIG. 5. In one embodiment of the present invention, the following information about the table will be stored: name of the view 112, name of the table 114 for which data is displayed, and list of the column identifiers, which are shown in the view 112. By means of example, the list is called columnList. The data provider, such as a database, that holds the actual data 116 from the storage media 122 is accessed to populate the table 114 that is used to create the view 112.

By means of example and referring now to Table 2, Column 2 and Column 3 are selected from Table 1. As shown in FIG. 5B, which is an example of creating a view 112, the name of the view (here View 1) is determined, as shown in element 510. Table 2 illustrates View 1 in the present example. The column names (here Column 2 and Column 3) are added into the list columnList, as shown in element 512. Also, the data provider is identified from information about Table 1, and is associated with View 1, as shown in element 514. By using the same data provider as was used for Table 1, it is guaranteed that View 1 is operating on the same set of data as Table 1. Creating View 1 with only the columns that are in columnList results in showing a subset of the columns from the underlying data provider in View 1.

TABLE 2 illustrates View 1

|       | Column 2 | Column 3 |
|-------|----------|----------|
| Row 1 | 1        | 1        |
| Row 2 | 2        | 2        |
| Row 3 | 3        | 3        |

Referring back to FIG. 5A, a second view 112, 'View 2', is identified and created as shown in element 503. By means of example View 2 may be created in the same way that View 1 is created. In the present example, View 2 is shown in Table 3. Referring to FIG. 5B, View 2 is created by determining the name for the view (here View 2), as shown in element 516. The column names (here Column 6 and Column 7) are added into the list columnList of View 2, as shown in element 518. The data provider is set to the data provider from Table 1, as shown in element 520. It will be understood that other embodiments of the present invention can operate in a different order, such as naming the view after associating the column and creating a new view.

TABLE 3 illustrates View 2

|       | Column 6 | Column 7 |
|-------|----------|----------|
| Row 1 | 1        | 1        |
| Row 2 | 2        | 2        |
| Row 3 | 3        | 3        |

Referring now back to FIG. 5A, View 1 and View 2 are combined, as shown in element 505. As further shown in element 505, and by means of example, dragging and dropping View 2 into View 1 efficiently creates a third view (View 3), as shown in Table 4. Referring now to FIG. 5C, using a mouse or other device to operate, the user can drag View 2 into View 1 to create View 3, as shown in element 522. More particularly, and by means of example, the user drags View 2 on top of View 1, and drops View 2 on top of View 1. The act of dragging and dropping is also shown in FIG. 4A, element 214. The user creates a new, combined view 112 that includes View 1 and View 2. It will be understood that element 522 is a specific example of the operation described in element 505. The name of the combined view 112 is set to View 3, herein shown as Table 4 and in element 524 of FIG. 5C.

Continuing to refer to FIG. 5C, the columns of View 1 are used to populate the columnList of View 3, as shown in element 526. Then, each item in columnList of View 2 is checked to determine if the column identifier (e.g. column(n), where n equals 1 to the number of column identifiers) already exists in columnList of View 3, as shown in element 528. If the column identifier doesn't exist as shown in the test of element 529, then it is added to the columnList of View 3, as shown in element 530. If the column identifier already exists as shown in the test of element 529, the column from View 2 can be ignored as it was shown in both View 1 and View 2, and was already added to View 3 via the use of View 1, as shown in element 532. When all the column identifiers for View 3 are checked, the data provider from either View 1 or View 2 is set as the data provider for View 3, as it is the same data provider. View 3 is created with only the columns from the list columnList of View 3, as shown in element 534

TABLE 4 illustrates View 3

|  | Column 2 | Column 3 | Column 6 | Column 7 |
| --- | --- | --- | --- | --- |
| Row 1 | 1 | 1 | 1 | 1 |
| Row 2 | 2 | 2 | 2 | 2 |
| Row 3 | 3 | 3 | 3 | 3 |

Figure 6:
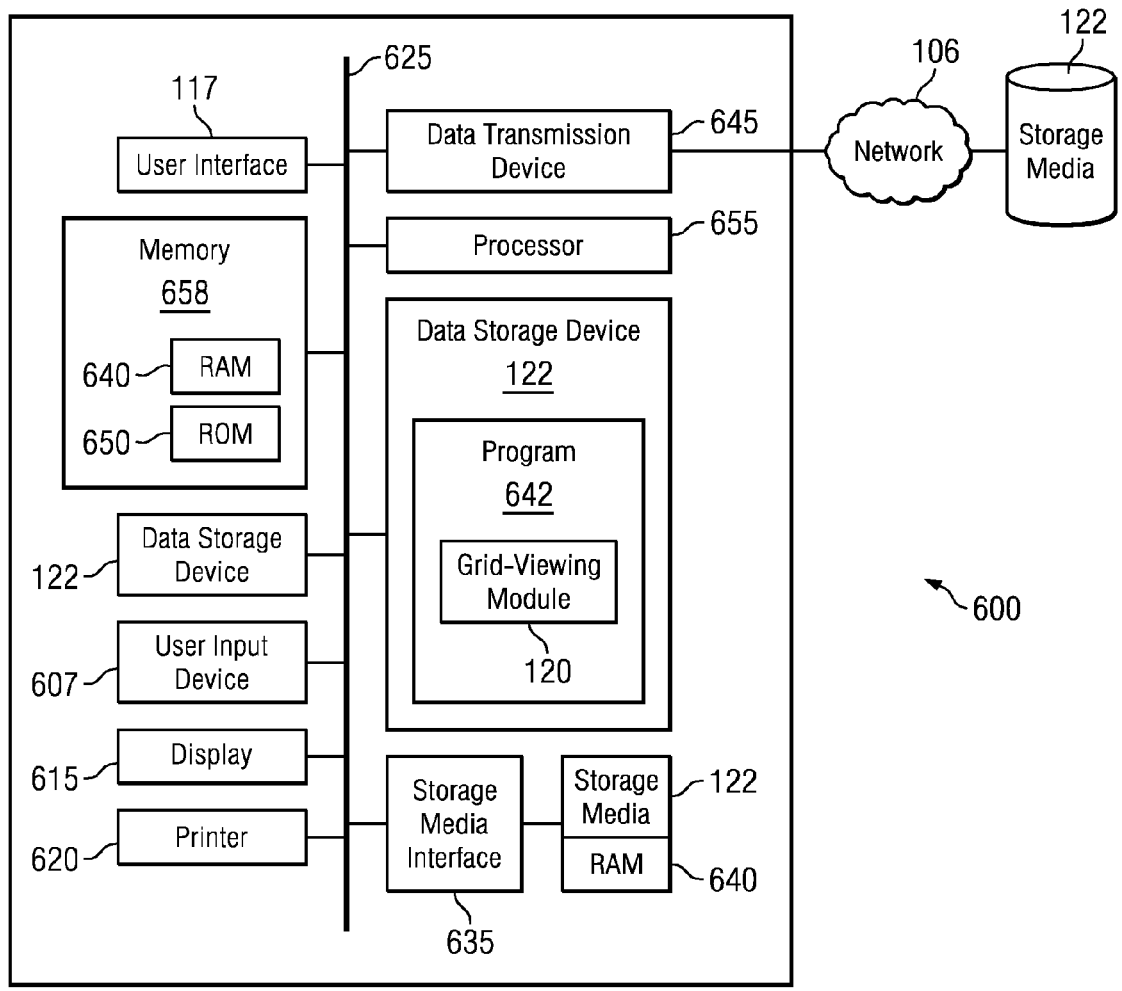
FIG. 6 is a block diagram of a computer system suitably configured for employment of the present invention.

Referring again to FIG. 5A, the act of dragging and dropping a second view into a first view 112, as shown in element 505, can be implemented in many ways, such as by the use of thumbnails. By means of example and as discussed with respect to FIG. 5B and element 516, where the name of View 2 is determined, it can be rendered in a thumbnail image that represents View 2. In one implementation, an image (in Java technology called BufferedImage) is an object which includes the width and height properties for the image, and by using different Java application programming interfaces (APIs) to render images, the view 112 may be rendered into the image. The image itself may be held in memory 658 (as shown in FIG. 6), or alternatively it may be written to a permanent storage media 122. By means of example, a thumbnail of a table may be created by specifying an object as output. The object may be rendered by techniques well know to those skilled in the art, such as by painting the object to the application. That is, the paint method will write to the canvas of an application, the identified object. In this example the identified object is a static in-memory image of the table 114. An example of a thumbnail is shown in element 208 of FIG. 4A.

As known to those skilled in the art, when the image is resized, the values for width and height of the image are changed and the image is rendered based on the new values for width and height. The height and width values for an image may be considered metadata associated with the image. This resizing scales the content of the image accordingly. For example by reducing the width and height by 80% an appropriate thumbnail of the table image can be rendered. The metadata associated with a thumbnail image may also include information about the name of the thumbnail, such as 'View 2'. In one embodiment of the present invention the metadata may be stored in a property list associated with the thumbnail.

Referring now to FIG. 5D one embodiment of the present invention creates thumbnails of view objects. Here references related to some of the existing views, View 1 and View 2, are stored in a list, such as existingViewsList, as shown in element 540. A visual representation, herein called a static image, such as a view of a table, is created to represent the columns of View 2, as shown in element 542. The static image is resized to a smaller size to create a thumbnail, static image, of View 2, as shown in element 544. The static image of View 2, here the thumbnail image, may be associated with the name of View 2 by setting the view name property to the name of View 2, so that the data 116 associated with View 2 may be manipulated and later retrieved, as shown in element 546. Using a mouse or other device to operate, the user can drag the thumbnail of View 2 into View 1 to create a new View 3, thereby combining both sets of columns of View 1 and View 2, as shown in element 548.

More particularly, and by means of example, element 548 may include the steps of dragging the thumbnail of View 2. There may be a propertyList associated with each thumbnail. The propertyList may include the view name, and optional information about the thumbnail. The thumbnail of View 2 is moved on top of View 1, and dropped on top of View 1. When the thumbnail is dropped, the actual view object for View 2 is retrieved by referencing the view name from the propertyList. Then, the information about the view is obtained from the existingViewsList. Each item in the existingViewsList is examined and the view name of the thumbnail is compared to the names in the existingViewsList. When the view name match is found, the view object is retrieved from the existingViewsList and the searching is stopped.

By means of example, and when implementing drag and drop techniques, those skilled in the art will understand that there are multiple elements involved. By means of example a drag source, which is an object that is eligible for a drag and drop operation, will be identified. A drag proxy image, which is a placeholder image of the drag source, may be created. This drag proxy image is moved until it is dropped onto a valid drop target location. When the drag and drop operation is finished, the proxy image is destroyed.

By means of further illustration and referring back to FIG. 5D and element 550, the thumbnail of View 2 is identified as a drag source and the propertyList of the thumbnail is updated to indicate that this object is eligible as a source for a drag and drop operation. As shown in element 552, when the user presses the mouse button on top of the thumbnail of View 2, the propertyList is checked to determine if the thumbnail has the property set to be a drag source. Since the property is set, the drag operation is started. A static image of the thumbnail of View 2 is created as a copy of the drag source, as shown in element 554. This is the drag proxy image which is moved around while the user is moving the mouse cursor. The mouse movements are captured and the location of the drag proxy image is updated on the screen to follow the mouse cursor. The user moves the mouse cursor on top of View 1 and releases the mouse button, as shown in element 556, View 1 is checked to see if it is a valid drop target. Since View 1 is a drop target the drag and drop operation is completed and the proxy image of the thumbnail of View 2 is destroyed.

As illustrated in Table 5 and as taught by the present invention, a column in a view 112 may be updated, and the modified data value may also be updated in any other view 112 that represents the same data value. More particularly, and by means of example, updating the data element in Table 5, Column 2 and Row 2, from the value '2' to '100' will result in a change in the data value in all views that obtain that data element from the same data provider. Recall that each view 112 is associated with a data provider that stores the actual data 116 which is displayed in the view 112. In an embodiment of the present invention, when additional views 112 are created, the view is associated with the same data provider as the data provider for the initial table 114 to ensure that all views 112 are operating on the same set of data 116 as the original table 114.

Referring now to FIG. 5E, an event subscription for a view 112 is added to a data change event which is dispatched by the data provider, as shown in element 560. The event is called herein DataChangeEvent. The DataChangeEvent is dispatched when any data 116 in the data provider has been changed. The DataChangeEvent can contain additional detailed information to identify the data 116 that has changed (e.g. sets of row or record identifiers and column identifiers and the new value for a particular cell in the table 114). An embodiment of the present invention can check whether the data change is relevant to the data 116 that is being displayed, as shown in element 562. Alternatively, the DataChangeEvent can be dispatched without providing more detailed information about which specific field has changed. This approach will force all views 112 which subscribe to the DataChangeEvent to update their displayed data 116, as shown in element 564.

Referring now to Table 5 that illustrates an updated View 1, and by means of example, the value of the cell, Column 2 and Row 2, is changed to '100'. Each row in the data provider is accessed to determine if the data 116 is associated with Column 2 and Row 2. When the proper location is identified, the data 116 is updated. It will be understood by those skilled in the art that in one embodiment of the present invention, the proper location may be identified by first locating the proper row that matches the element identifier. Then, the proper column identifier is matched with the column identifier in the columnList.

A DataChangeEvent is dispatched on the data provider to indicate that data has been updated in the data provider. The detail information about the changed data 116 is added to the DataChangeEvent by setting the attributes for the column and row to Column 2 and Row 2, and setting the new value attribute to '100'. Referring back to FIG. 5E, the present example illustrates changing data that may be checked as described in element 562. Alternatively, the changed data may be identified by use of a general event as described in element 564.

TABLE 5 illustrates updated View 1

|  | Column 2 | Column 3 |
|---|---|---|
| Row 1 | 1 | 1 |
| Row 2 | 100 | 2 |
| Row 3 | 3 | 3 |

Referring now to Table 6 (and as described with respect to FIG. 5E, element 562), View 3 is illustrated and uses the same underlying data provider as View 1 and View 2. Further, View 3 is also subscribed to the DataChangeEvent. Therefore, View 3 receives the DataChangeEvent which was dispatched in the previous step, with respect to Table 5. The detailed information about the data 116 which has changed (i.e. in this example, Column 2 and Row 2 with new value '100') is retrieved for View 3. More particularly, the columnList of View 3 is examined and each column identifier is compared with the column identifier of the DataChangeEvent to determine whether there is a match. If a match is identified, a change of the appropriate data in the proper row is made in View 3. Here, the data in Column 2 and Row 2 is changed to the same, changed value in View 1 Column 2 and Row 2.

TABLE 6 illustrates updated View 3

|  | Column 2 | Column 3 | Column 6 | Column 7 |
|---|---|---|---|---|
| Row 1 | 1 | 1 | 1 | 1 |
| Row 2 | 100 | 2 | 2 | 2 |
| Row 3 | 3 | 3 | 3 | 3 |

Referring now to Table 7, which illustrates updating a value in View 2, the data value in Column 6 and Row 2 is changed, from '2' to '200'. The steps for changing the data value in Column 2 and Row 2 (described with respect to FIG. 5E and to Table 5), are similar to the process of changing the data element in Column 6 and Row 2.

TABLE 7 illustrates updated View 2

|  | Column 6 | Column 7 |
|---|---|---|
| Row 1 | 1 | 1 |
| Row 2 | 200 | 2 |
| Row 3 | 3 | 3 |

Table 8 illustrates View 3 after View 1 has been updated as described with respect to Table 5, and after View 2 has been updated as described with respect to Table 7. Since the data element in Column 2 and Row 2; and the data element in Column 6 and Row 2 have both been changed, the updated data elements are shown in the updated View 3 illustrated in Table 8. It will be appreciated that updating data elements in View 3 may be completed in the manner described with respect to FIG. 5E.

TABLE 8 illustrates updated View 3

|  | Column 2 | Column 3 | Column 6 | Column 7 |
|---|---|---|---|---|
| Row 1 | 1 | 1 | 1 | 1 |
| Row 2 | 100 | 2 | 200 | 2 |
| Row 3 | 3 | 3 | 3 | 3 |

Table 9 illustrates updating the initial view that was described with respect to Table 1. More particularly, the data provider 115 may dispatch a data change event called DataChangeEvent when any of the data in the view of Table 1 is changed. Since the data in the view of Table 1 uses the same data provider as View 1, View 2, and View 3; the implementation is similar to the steps described to change a data value in View 1, View 2, or View 3. More particularly and by means of example, the data value in Column 2 and Row 2 of Table 1 is changed to '300'; and the data value in Column 6 and Row 2 of the view of Table 1 is changed to '300'. Then, an event subscription is added for the DataChangeEvent to View 1, View 2 and View 3. Two DataChangeEvents are dispatched on the data provider 115: one for the change in Column 2 and Row 2; and one for the change in Column 6 and Row 2. The detailed information for the changed values is added in each event by setting the attributes for the row identifier, the column identifier, and the new value. This process is also described with respect to FIG. 5E.

TABLE 9 illustrates an updated initial view that was described with respect to Table 1

|       | Column 1 | Column 2 | Column 3 | Column 4 | Column 5 | Column 6 | Column 7 | Column 8 | Column 9 | Column 10 |
|-------|----------|----------|----------|----------|----------|----------|----------|----------|----------|-----------|
| Row 1 | 1        | 1        | 1        | 1        | 1        | 1        | 1        | 1        | 1        | 1         |
| Row 2 | 2        | 300      | 2        | 2        | 2        | 300      | 2        | 2        | 2        | 2         |
| Row 3 | 3        | 3        | 3        | 3        | 3        | 3        | 3        | 3        | 3        | 3         |

Given the change to data 116 that was described with respect to Table 9, any other views that include the same data 116 will be updated. By means of example, and as described with respect to Table 10, View 1 will be updated. In one embodiment of the present invention, View 1 receives the DataChangeEvent for the data value change in Column 2 and Row 2. View 1 also receives the DataChangeEvent for the change in Column 6 and Row 2. Similar to the description of updating a data value in FIG. 5, element 562, the columnList of View 1 is traversed and the information is compared to the column identifier of the DataChangeEvent to determine whether there is a match. Alternatively, the row identifier is initially checked for a match. Then, if a match is found the column identifier is checked for a match. Since there is only a match with Column 2, the data value for Column 2 and Row 2 will be updated as shown in Table 9. Table 10 illustrates an updated View 1 that reflects the change in data value to match the data value in Column 2 and Row 2 of Table 9.

TABLE 10 illustrates an updated View 1

|       | Column 2 | Column 3 |
|-------|----------|----------|
| Row 1 | 1        | 1        |
| Row 2 | 300      | 2        |
| Row 3 | 3        | 3        |

Given the change to data that was described with respect to Table 9, any other views that include the same data will be updated. By means of example, and as described with respect to Table 11, View 2 will also be updated. In one embodiment of the present invention, View 1 receives the DataChangeEvent for the data value change in Column 2 and Row 2. View 2 also receives the DataChangeEvent for the change in Column 6 and Row 2. Similar to the description of updating a data value in FIG. 5, element 562, the columnList of View 2 is traversed and the information is compared with the column identifier initially, to check for a match. It will be appreciated that the search for a match to Column 2 will fail. So View 2 will not be updated with the change to Column 2 and Row 2. But, the search for a match to Column 6 will succeed. Therefore the data value in Column 6 and Row 2 will be updated to match the data value of Table 9 for Column 6 and Row 2. Table 11 illustrates an updated View 2 that reflects the change in data value that is illustrated in Table 9.

TABLE 11 illustrates an updated View 2

|       | Column 6 | Column 7 |
|-------|----------|----------|
| Row 1 | 1        | 1        |
| Row 2 | 300      | 2        |
| Row 3 | 3        | 3        |

Table 12 illustrates the updated View 3 that matches the update to View 1 as shown in Table 10, and the update to View 2 as shown in Table 11. The process for updating the data value for View 3 and herein shown in Table 12 is similar to that described with respect to Table 10 and Table 11. In this case, the search for a match to Column 2 will succeed and the search for a match to Column 6 will succeed. So the data value in Column 2 and Row 2 will be changed and the data value in Column 6 and Row 2 will be updated to match the respective data values of Table 9.

TABLE 12 illustrates an updated View 3

|       | Column 2 | Column 3 | Column 6 | Column 7 |
|-------|----------|----------|----------|----------|
| Row 1 | 1        | 1        | 1        | 1        |
| Row 2 | 300      | 2        | 300      | 2        |
| Row 3 | 3        | 3        | 3        | 3        |

In a manner similar to changing data values in the original table, and propagating the changed data values to the other views 112 having the same data values; changes in the views 112 are also propagated back into the original table. More particularly and as described with respect to Table 13, changing a data element in View 1, such as changing Column 2 and Row 2 to '400' will be reflected in the initial view that was described with respect to Table 1. By means of example and in one embodiment of the present invention, an event subscription is added for the DataChangeEvent for Table 1. Then, the data value in View 1 Column 2 and Row 2 is changed to '400'. A DataChangeEvent is dispatched in the data provider 115 to indicate that data value has been updated in the data provider 115. Additional information is updated by setting the attributes column identifier to Column 2 and the row identifier to Row 2 and the new value to '400'.

TABLE 13 illustrates an updated View 1

|       | Column 2 | Column 3 |
|-------|----------|----------|
| Row 1 | 1        | 1        |
| Row 2 | 400      | 2        |
| Row 3 | 3        | 3        |

After the updating process for View 1 as described with respect to Table 13 is completed, the initial table described with respect to Table 1 is updated. The updated data value is illustrated in Table 14. Since the initial table described with respect to Table 1 uses the same underlying data provider 115 as View 1, View 2, and View 3, and is subscribed to the DataChangeEvent of the data provider 115, the initial table receives the DataChangeEvent which was dispatched for the change to View 1, as described with respect to Table 13. Because the initial table as described with respect to Table 1 shows all the columns of the underlying data provider, it is not necessary to check whether the DataChangeEvent is relevant to the particular changed data 116. Therefore, the changed data value information is retrieved. In the present example, the changed value for Column 2 and Row 2, '400', is retrieved. The appropriate data value in the view of the initial table, here Column 2 and Row 2 data value, is updated to '400'. Therefore, as shown in Table 14, the data value in Column 2 and Row 2 is updated to '400'. View 2 and View 3 also receive the DataChangeEvent which is dispatched after changing the data in View 1. Since only View 3 contains Column 2 and Row 2, View 3 will be updated as well.

TABLE 14 illustrates updated Column 2 and Row 2

|  | Column 1 | Column 2 | Column 3 | Column 4 | Column 5 | Column 6 | Column 7 | Column 8 | Column 9 | Column 10 |
|---|---|---|---|---|---|---|---|---|---|---|
| Row 1 | 1 | 1 | 1 | 1 | 1 | 1 | 1 | 1 | 1 | 1 |
| Row 2 | 2 | 400 | 2 | 2 | 2 | 2 | 2 | 2 | 2 | 2 |
| Row 3 | 3 | 3 | 3 | 3 | 3 | 3 | 3 | 3 | 3 | 3 |

In addition to data changes propagated from the existing View 1 and View 2 into the newly created View 3, also changes in View 3 will be propagated back into View 1 or View 2 as appropriate. By means of example and as shown in Table 15, an event subscription for the DataChangeEvent is added to View 1. In View 3 the data value for Column 2 and Row 2 is changed to '500'. A DataChangeEvent is dispatched on the data provider to indicate that data value has been updated in the data provider. The information about the changed data value is provided by setting the attributes for Column 2, Row 2, and the new value '500'.

TABLE 15 illustrates updated View 3

|  | Column 2 | Column 3 | Column 6 | Column 7 |
|---|---|---|---|---|
| Row 1 | 1 | 1 | 1 | 1 |
| Row 2 | 500 | 2 | 2 | 2 |
| Row 3 | 3 | 3 | 3 | 3 |

As a result of the change in data value described with respect to Table 15, View 1 is updated. View 1 receives a DataChangeEvent for the change in Column 2 and Row 2. After the update operation, View 1 is changed as illustrated in Table 16.

TABLE 16 illustrates updated View 1

|  | Column 2 | Column 3 |
|---|---|---|
| Row 1 | 1 | 1 |
| Row 2 | 500 | 2 |
| Row 3 | 3 | 3 |

By means of example and as illustrated in Table 17, View 3 may be stored, and a new view 112 may be propagated from the stored view. That is, not only the initial table, as described with respect to Table 1, can be used as source to create a new view, also any existing or newly created view 112 which may only show a subset of the columns of the initial table may be used as a source to create a new view 112. For example, Column 6 in View 3 may be selected. Then a new view name is set, such as View 4. The Column 6 identifier is added to the columnList of View 4. The data provider from the View 3 is identified for View 4. By using the same data provider as View 3, all other views, and the initial table, it is guaranteed that View 4 is operating on the same set of data as the initial table as described with respect to Table 1. A view 112 may be created with only the columns from the list columnList of View 4, as shown in Table 17.

TABLE 17 illustrates View 4

|  | Column 6 |
|---|---|
| Row 1 | 1 |
| Row 2 | 2 |
| Row 3 | 3 |

FIG. 6 is a block diagram of a computer system 600, suitable for employment of the present invention. System 600 may be implemented on a general-purpose microcomputer, such as one of the members of the IBM Personal Computer family, or other conventional work-station or graphics computer devices, or mainframe computers. In one embodiment, system 600 includes a user interface 117, a user input device 607, a display 615, a printer 620, a processor 655, a read only memory (ROM) 650, a data storage media 122, such as a hard drive, a floppy disk drive, a tape drive, removal memory cards, or optical storage, a random access memory (RAM) 640, and a storage media interface 635, all of which are coupled to a bus 625 or other communication means for communicating information. System 600 may operate as a standalone system, or it may be part of a networked system. For example, the computer system 600 may be connected locally or remotely to fixed or removable data storage devices 122 and data transmission devices 645. Further, the computer system 100, the server computer system 102, and the client computer system 104 also could be connected to other computer systems via the data transmission devices 645, or a network interface card, that interface to the network 106. Elements 100, 102, 104, 116, and 122 are described with reference to FIG. 1.

The RAM 640, the data storage device 122 and the ROM 650, are memory components 658 that store data 116 and instructions for controlling the operation of processor 655, which may be configured as a single processor or as a plurality of processors. The processor 655 executes a program 642 to perform the methods of the present invention, as described herein. In one embodiment of the present invention the grid-viewing module 120 is a component of the program 642.

While the program 642 is indicated as loaded into memory 658, such as the RAM 640 or ROM 650, it may be configured for subsequent loading into the data storage device 122, the ROM 650, the RAM 640, or the like, via an appropriate storage media interface 635. While memory is shown as a single entity, it may also comprise a plurality of modules. Storage media 122 can be any conventional storage media such as a magnetic tape, data storage device, an optical storage media, a compact disk, or a floppy disk. Alternatively, storage media 122 can be a random access memory 640, or other type of electronic storage, located on a remote storage system, and may be connected to a network 106.

The computer is generally under the control of an operating system that typically supports the functions disclosed herein. Generally, the computer programs and operating systems are all tangibly embodied in a computer-readable device or media, such as the memory 658, the data storage device 122, or the data transmission device 645, thereby making an article of manufacture, such as a computer program product, according to the invention. As such, the terms "computer program product" as used herein are intended to encompass a computer program 642 accessible from any computer readable device or media.

Moreover, the computer programs 642 and operating systems are comprised of instructions which, when read and executed by the computer system 100, the server computer system 102, and the client computer system 104, cause the computer system 100, the server computer system 102, and the client computer system 104 to perform the steps necessary to implement and use the present invention. Under control of the operating system, the computer programs 642 may be loaded from the memory 658, the data storage device 122, or the data transmission devices 645; into the memories 658 of the computer system 100, the server computer system 102, and the client computer system 104 for use during actual operations. Those skilled in the art will recognize many modifications may be made to this configuration without departing from the scope of the present invention.

The user interface 117 is an input device that interfaces with the user input device 607 to communicate information and command selections to the processor 655. The user can observe information generated by the system 600 via the display 615 or the printer 620. The user input device 607 is a device such as a keyboard, keypad, light pen, touch screen, track ball, audio/video player, speech recognition subsystem, joy-stick, or the like, which allows the user to manipulate a cursor on the display 615 for communicating additional information and command selections to the processor 655.

When operating in accordance with one embodiment of the present invention, the system 600 creates, updates, saves, and propagates data in user-defined views of grid information, typically by use of the grid-viewing module 120. The processor 655 and the program 642 collectively operate as a module for operating on one embodiment of the present invention. The present invention is typically implemented using one or more computer programs 642, each of which executes under the control of an operating system and causes the computer system 100, the server computer system 102, and the client computer system 104 to perform the desired functions as described herein. The programs 642 may include the grid-viewing module 120 in one embodiment of the present invention. Thus, using the present specification, the invention may be implemented as a machine, process, method, system, or article of manufacture by using standard programming and engineering techniques to produce software, firmware, hardware or any combination thereof. It will be appreciated that the present invention offers many advantages over prior art techniques.

Additional Embodiment Details

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable medium(s) having computer readable program code embodied thereon.

Any combination of one or more computer readable medium(s) may be utilized. The computer readable medium may be, for example but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature.

The present invention is intended to embrace all such alternatives, modifications and variances that fall within the scope of the appended claims

TRADEMARKS

IBM is a trademark or registered trademark of International Business Machines Corporation in the United States and other countries. Java and all Java-based trademarks and logos are trademarks of Sun Microsystems, Inc., in the United States, other countries, or both.

What is claimed is:

1. A computer-implemented method for efficiently creating views from columns of a table, comprising:
    associating a first column having first values in a set of rows from said table as a first view of said table that displays said first column with said first values in said set of rows;
    associating a second column having second values in said set of rows from said table as a second view of said table that displays said second column with said second values in said set of rows;
    combining said first view with said second view, thereby efficiently creating a third view that displays said first column and said second column with said first values and said second values in said rows; and
    displaying in full one of said first view, said second view, and said third view with a thumbnail image of each of said first view, said second view, and said third view that is not displayed in full, wherein said thumbnail image provides an indication of columns in that thumbnail image, and wherein selection of said thumbnail image displays the columns in that thumbnail image in full.

2. The computer-implemented method of claim 1, further comprising:
    said combining including:
        dragging said second view; and
        dropping said dragged second view into said first view.

3. The computer-implemented method of claim 1, further comprising:
    said combining including:
        creating a thumbnail image representing said second view;
        dragging said thumbnail image to said first view; and
        dropping said thumbnail image into said first view.

4. The computer-implemented method of claim 1, further comprising
    updating a value of a cell in at least one of said first column in said first view and said second column in said second view;
    updating said value of said cell in a database storing said table; and
    propagating said updated value to said cell to said third view from said database, wherein said third view displays said updated value in said cell.

5. The computer-implemented method of claim 1, further comprising said first view including said table.

6. The computer-implemented method of claim 1, further comprising:
    updating a value of a cell in said first column in said third view; and
    propagating said updated value to said cell to said first view, wherein said first view displays said updated value in said cell.

7. The computer-implemented method of claim 1, further comprising:
    storing said third view; and
    propagating a new view from said stored third view.

* * * * *